(12) United States Patent
Pavy

(10) Patent No.: US 6,553,004 B1
(45) Date of Patent: Apr. 22, 2003

(54) METHOD AND DEVICE TO REDUCE THE PEAK FACTOR OF DIGITAL RADIO OR TELEVISION BROADCASTING SIGNALS

(75) Inventor: Jean-Luc Pavy, Luzel (FR)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/190,483

(22) Filed: Nov. 12, 1998

(30) Foreign Application Priority Data

Nov. 14, 1997 (FR) ............................................ 97 14318

(51) Int. Cl.[7] .................................................. H04J 1/00
(52) U.S. Cl. ...................................... 370/281; 370/480
(58) Field of Search ................................ 370/281, 206, 370/207, 208, 205, 350, 500, 468, 210, 463, 480, 320, 335, 222, 260, 221, 346, 325, 360, 465, 211, 535, 537; 327/155, 156; 329/307, 325, 360; 375/130, 143, 240.17, 240.22, 240.23, 241, 245, 298, 299

(56) References Cited

U.S. PATENT DOCUMENTS

| 5,930,231 A | * | 7/1999 | Milles et al. ................ 370/210 |
| 5,970,053 A | * | 10/1999 | Schick et al. ................ 370/252 |
| 6,157,619 A | * | 12/2000 | Ozlutuek et al. ........... 370/252 |
| 6,181,714 B1 | * | 1/2001 | Isaksson et al. ............ 370/206 |

* cited by examiner

Primary Examiner—Dang Ton
(74) Attorney, Agent, or Firm—Tarolli, Sundheim, Covell & Tummino L.L.P.

(57) ABSTRACT

The disclosure relates to digital radio broadcasting and television broadcasting systems. The digital signals provided by the modulator in quadrature at the frequency ($F_0$) are applied to a processing circuit that carries out a conversion according to a determined relationship in order to reduce the peak factor (Fc) of the signals applied to the amplifier of the transmitter. The digital signals processed are applied to a band-pass filter centered on ($f_0$) to attenuate the spectral components introduced by the processing operation.

12 Claims, 2 Drawing Sheets

METHOD AND DEVICE TO REDUCE THE PEAK FACTOR OF DIGITAL RADIO OR TELEVISION BROADCASTING SIGNALS

BACKGROUND OF THE INVENTION

The invention relates to digital type radio broadcasting and television broadcasting systems in which digital signals' are sent out in a number N of carrier frequencies, N ranging from some hundreds to some thousands, the spacing between neighboring carrier frequencies varying from some hundreds of hertz to some kilohertz.

As an indication, the signal that is sent out in digital radio broadcasting has a band width of 1536 Khz and attenuation of about 50 dB between the useful band and the shoulders as can be seen in the drawing of FIG. 1. In digital television broadcasting, the signal transmitted has a band width of 7.61 Mhz and attenuation which also is about 50 dB. To send out a signal of this kind, the power amplifier positioned at output of the modulator must accept a signal having a high peak factor $F_c$ ($F_c$=maximum power/mean power) and must thus accept high power peaks. This results in an oversizing of the amplifier leading to high cost.

An aim of the present invention is a method and a system making it possible to control and reduce this peak factor Fc so as to reduce the size and therefore the cost of the power amplifier.

SUMMARY OF THE INVENTION

The invention relates to a method of frequency-division multiplexing in which the output signals from a frequency-division multiplexer are converted into temporal digital signals with components I and Q modulated in quadrature at the frequency $f_0$, the signals resulting from the modulation in quadrature being applied to a peak factor amplifier $F_c$, wherein said method comprises the following additional operations consisting in:

(a) processing the digital signals given by the operation of modulation in quadrature or by the scaling operation according to a relationship determined to obtain other digital signals having characteristics tending to reduce their peak factor $F_c$, and (b) filtering the digital signals processed by the preceding operation to attenuate the spectral components introduced by the processing of the digital signals outside the useful band.

The determined processing relationship may be obtained by a clipping of the digital signals or by a correspondence table.

Should the method be applicable to signals modulated in quadrature, the device according to the invention comprises;

a circuit for the processing of the digital signals given by the operation of modulation in quadrature according to the determined relationship, and a band-pass filter centered on the frequency $f_0$ of modulation in quadrature.

Should the method be applicable to the components in quadrature I and Q, the device according to the invention comprises, for each component I and Q:

a circuit for the processing of the signals given by the scaling operation, and a low-pass filter, the digital signals given by the low-pass filter being then modulated in quadrature at the frequency $f_o$.

BRIEF DESCRIPTION OF THE DRAWINGS

Other features and advantages of the present invention shall appear from the following description of an exemplary embodiment, this description being made with reference to the appended drawings, of which.

MORE DETAILED DESCRIPTION

Figure 1:
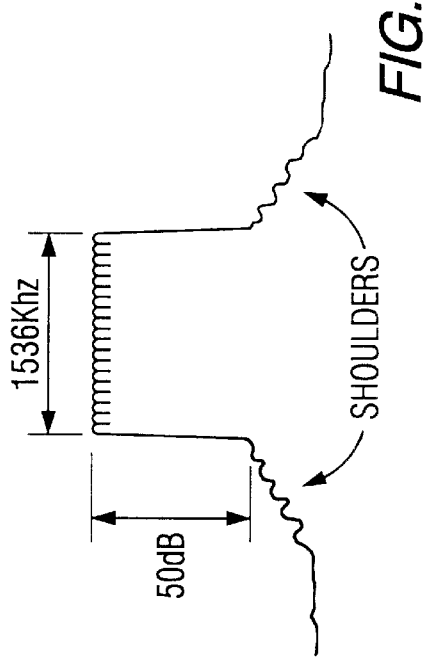
FIG. 1 is a graph showing a baseband frequency spectrum of a signal transmitted in a digital type radio broadcasting system to which the invention can be applied.
Figure 2:
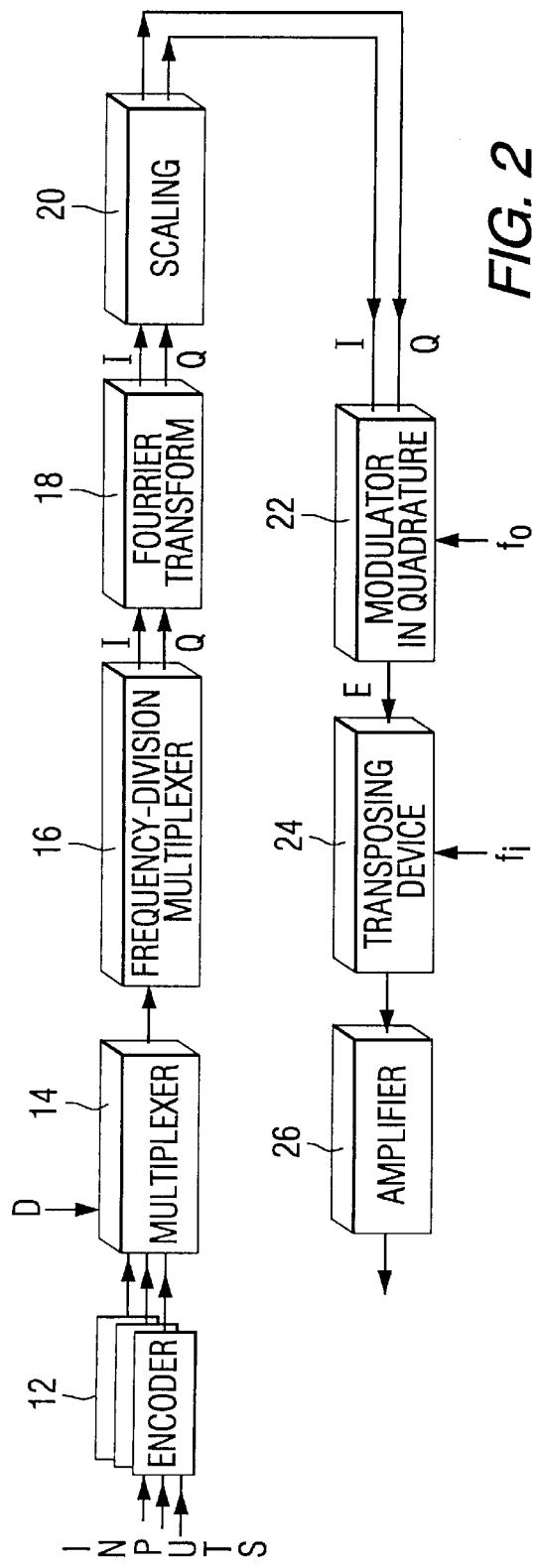
FIG. 2 is a highly simplified drawing of a digital radio broadcasting system applicable to the invention.

The diagram of FIG. 2 provides a high concise view of a digital radio broadcasting system to which the invention can be applied. The system comprises encoders 12 to encode, each in digital form, the analog signals coming from various sources. The digital codes given by the encoder 12 are applied to a multiplexing circuit or multiplexer 14 to which pieces of data D are also applied. The digital codes coming out of the multiplexer 14 are applied to an orthogonal frequency division multiplexing (OFDM) circuit 16. At the output of this multiplexing circuit 16, the signal has a spectrum similar to the type shown in FIG. 1 in baseband.

This frequency-division multiplexed signal is applied to a device 18 that performs a digital Fourier transform and gives a, temporal signal having two digital components I and Q in quadrature. These components I and Q are applied to a device known as a scaling device 10 designed to reduce the dynamic range of the two components to adapt it to the rest of the radio broadcasting system.

The two components I and Q thus scaled are applied to an in-quadrature modulator 22 at a frequency $f_0$. This modulator 22 gives a temporal signal E in digital form. The signal E is transposed into an intermediate frequency $f_i$ in a device 24, in order to be amplified in an amplifier 26 before transmission.

According to the invention, the signal E given by the modulator 22 is processed in a device 30 (FIG. 3) to modify its frequency spectrum (FIG. 1) so that the "shoulders" are at a higher level, for example 30 dB, reducing the peak factor $F_c$. This modified signal is then filtered in a digital type of band-pass filter 32 so as to reduce the level of the "shoulders" to 50 dB in accordance with the requisite specifications.

The processing carried out by the device 30 consists for example of an operation for the clipping of the digital signal E but another processing relationship may be implemented in order to optimize the peak factor $F_c$.

Figure 4:
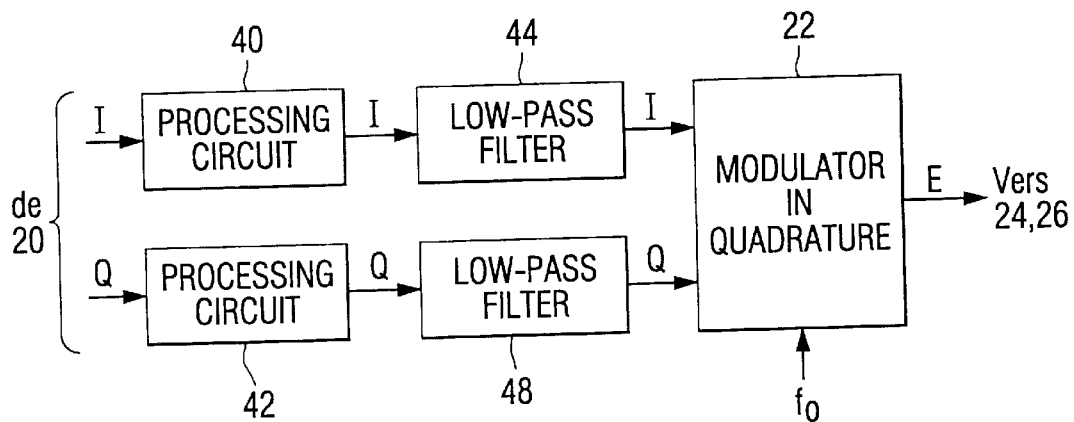
FIG. 4 is a functional diagram of a second device according to the invention.

According to one variant of the invention, the processing according to the invention may be done before the modulation in quadrature, namely on both the output components I and Q from the scaling device 20. The diagram is then the one shown in FIG. 4.

Each component I and Q is applied respectively to a processing device 40 or 42 that is followed by a low-pass filter 44 or 46. The two filtered components I and Q are applied to the in-quadrature modulator 22 that gives the digital signal E.

Figure 3:
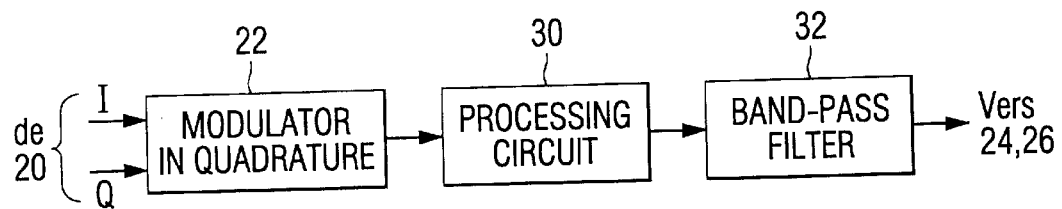
FIG. 3 is a functional diagram of a first device according to the invention.

The processing device 40 or 42, like the device 30 of FIG. 3, carries out either an operation for the clipping of the components I and Q or any other function in order to diminish and optimize the peak factor $F_c$.

This processing function may be performed by a correspondence table according to a determined relationship between the input codes representing H or I and Q and output codes read in the table. This correspondence table is set up, for example, by a prerecorded memory that is addressed by input codes.

What is claimed is:

1. A method of encoding digital data within a transmitted signal, comprising:

inputting digital data and an existing signal into a multiplexer to produce a combined output signal with a frequency spectrum having signal shoulders, with a relatively low power, and a signal maximum;

converting the combined output signal into a temporal digital signal with two components in quadrature via a Fourier transform;

scaling the components to reduce their dynamic range to levels acceptable for a selected application;

modulating the scaled components in quadrature at a predetermined frequency to generate a modulated digital signal;

processing the modulated digital signal to reduce the difference in power between the signal maximum and the signal shoulders in the frequency spectrum associated with the combined output signal;

filtering the processed signal; and amplifying the filtered signal for transmission.

2. A method as set forth in claim 1, wherein the step of processing the modulated digital signal includes a clipping operation.

3. A method as set forth in claim 1, wherein the step of filtering the processed signal includes applying a digital band-pass filter to the processed signal.

4. A method as set forth in claim 1, wherein the step of processing the modulated signal includes referring to a table of correspondence, stored in a system memory and reflecting a predetermined relationship between an inputted signal, with an associated frequency spectrum peak factor, and a desired output signal, with an associated peak factor smaller than that of the inputted modulated digital signal.

5. A method of encoding digital data within a transmitted signal, comprising:

inputting digital data and an existing signal into a multiplexer to produce a combined output signal with an associated frequency spectrum peak factor;

converting the combined output signal into a temporal digital signal, comprising two components in quadrature, via a Fourier transform;

scaling the components to reduce their dynamic range to levels acceptable for a selected application;

processing the scaled components in such a manner as to reduce the peak factor associated with the combined output signal;

filtering the processed components;

modulating the filtered components in quadrature at a predetermined frequency to generate a modulated digital signal; and amplifying the modulated signal for transmission.

6. A method as set forth in claim 5, wherein the step of processing the scaled components includes a clipping operation.

7. A method as set forth in claim 5, wherein the step of filtering the processed components includes applying a digital band-pass filter to the processed components.

8. A method as set forth in claim 5, wherein the step of processing the scaled components includes referring to a table of correspondence, stored in a system memory and reflecting a predetermined relationship between an inputted scaled component and an associated desired output.

9. An apparatus for encoding digital data within a transmitted signal, comprising:

a multiplexer that receives digital data and an existing signal and produces a combined output signal with a frequency spectrum having signal shoulders, with a relatively flow power, and a signal maximum;

a digital Fourier transform device that converts the combined output signal into a temporal digital signal with two components in quadrature via a Fourier transform;

a scaling device that scales the components to reduce their dynamic range to levels acceptable for a selected application;

a in-quadrature modulator that modulates the scaled components in quadrature at a predetermined frequency to generate a modulated digital signal;

a processing device that processes the modulated digital signal to reduce the difference in power between the signal maximum and the signal shoulders in the frequency spectrum associated with the combined output signal;

a digital band-pass filter that filters the processed signal; and an amplifier that amplifies the filtered signal for transmission.

10. An apparatus as set forth in claim 9, wherein the processing device includes a system memory, containing a table of correspondence reflecting a predetermined relationship between an inputted signal, with an associated frequency spectrum peak factor, and a desired output signal, with an associated peak factor smaller than that of the inputted modulated digital signal.

11. An apparatus for encoding digital data within a transmitted signal, comprising:

a multiplexer that receives digital data and an existing signal and produces a combined output signal with an associated frequency spectrum peak factor;

a digital Fourier transform device that converts the combined output signal into a temporal digital signal, comprising two components in quadrature, via a Fourier transform;

a scaling device that scales the components to reduce their dynamic range to levels acceptable for a selected application;

a processing device that processes the scaled components in such a manner as to reduce the peak factor associated with the combined output signal;

a digital band-pass filter that filters the it processed components;

a in-quadrature modulator that modulates the filtered components in quadrature at a predetermined frequency to generate a modulated digital signal; and an amplifier that amplifies the modulated signal for transmission.

12. An apparatus as set forth in claim 11, wherein the processing device includes a system memory, containing a table of correspondence reflecting a predetermined relationship between an inputted scaled component and an associated desired output.

* * * * *